April 12, 1966   H. J. HANSEN ET AL   3,245,423
VALVED COUPLING WITH FUSIBLE SAFETY CUT-OFF MEANS
Filed June 15, 1962
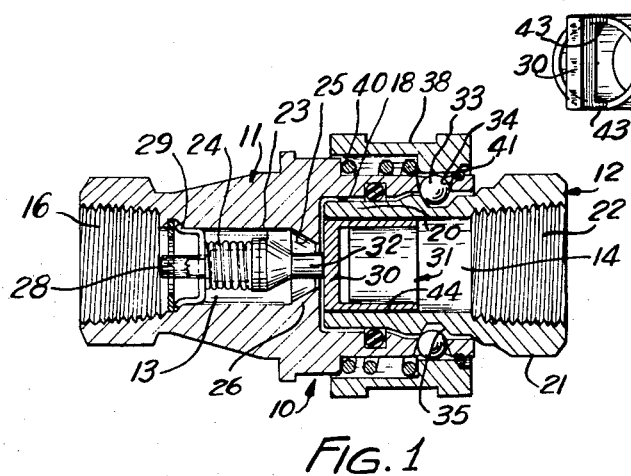
FIG. 1
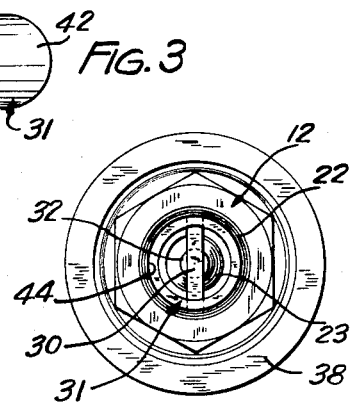
FIG. 3
FIG. 2
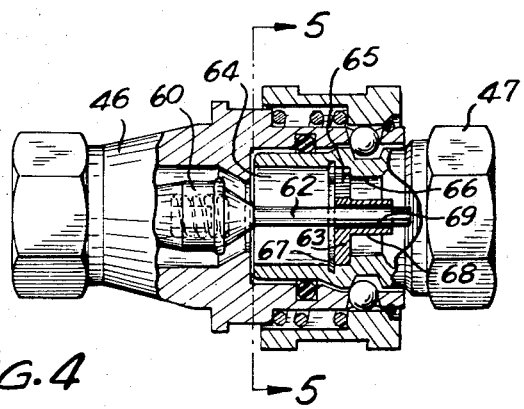
FIG. 4
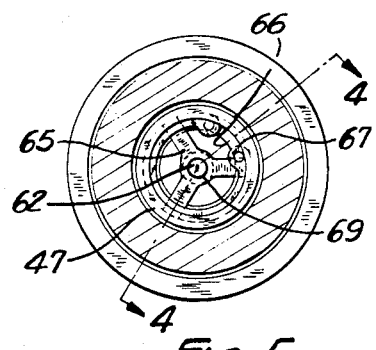
FIG. 5
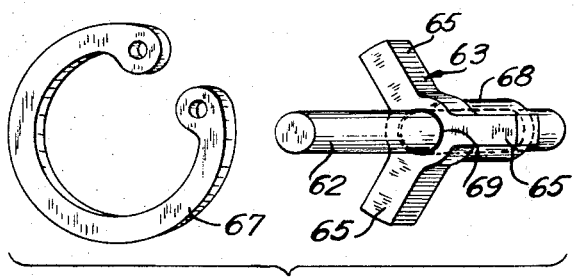
FIG. 6
INVENTORS
HOWARD J. HANSEN
ROBERT W. HURSH
BY Williams, David,
Hoffmann & Hunt.
ATTORNEYS United States Patent Office 3,245,423
Patented Apr. 12, 1966

3,245,423
VALVED COUPLING WITH FUSIBLE SAFETY
CUT-OFF MEANS
Howard J. Hansen and Robert W. Hursh, Bay Village, Ohio, assignors to The Hansen Manufacturing Company, Cleveland, Ohio, a corporation of Ohio
Filed June 15, 1962, Ser. No. 202,831
8 Claims. (Cl. 137—74)

The present invention relates to a quick-disconnect coupling having a self-closing valve and, more particularly, to such a coupling particularly suitable for use in making connection to gas lines or other lines containing an inflammable fluid.

An object of the present invention is to provide a quick-disconnect coupling for making a connection to a gas line or other line containing a combustible fluid which includes a self-closing valve that automatically closes in response to a predetermined temperature level.

Another object of the present invention is to provide a new and improved quick-disconnect coupling for making a connection to a gas line or other line containing a combustible fluid which will close the line when the connection is disconnected or when the temperature in the area reaches a predetermined level.

A further object of the present invention is to provide a new and improved coupling as in the preceding objects wherein the valve is held open against the action of a spring by a nose member which is fixed against movement by fusible material which fuses in response to a high temperature to release the nose member and allow the valve to close, the coupling being so constructed that the plunger member will not break away before the desired temperature is reached and, when broken, will have little or no tendency to cock or jam and prevent the valve from seating.

A still further object of the present invention is to provide a new and improved self-closable valve which is held open by a member secured in position by fusible material and which is so constructed and arranged that the fusible material is capable of carrying a heavy spring load, and the member, when released, will be guided in its movement by the valve so that it does not jam.

It is a still further object of the present invention to provide a new and improved self-closing valve which is adapted to close when the temperature in the area reaches a predetermined level and which is of extremely simple construction and sure in operation.

In the preferred embodiment, the above objects and others are accomplished by providing a quick-disconnect fluid coupling including a socket part and a cooperating plug part adapted to be received in the socket part, one of the parts having a self-closing valve biased to close the fluid passage through the part, and the other part having a nose member adapted to engage the valve and open it when the parts are connected, the nose member being fixed in its part by fusible material which fuses at high temperatures to allow the bias on the valve to move the valve and nose member and close the valve. In the preferred form, the nose member includes a guide portion, preferably cylindrical, which cooperates with a corresponding portion fixed to the part supporting the nose member and functions to constrain the nose member against cocking or jamming when the fusible material fuses. Moreover, in the preferred embodiment, the fusible connection between the nose member and its part comprises a strip or band of solder which has substantial extent in the axial direction.

Further objects and advantages of the present invention will be apparent from the following detailed description made with reference to the accompanying drawings forming a part of the present specification for all subject matter disclosed therein and in which:

FIG. 1 is a cross-sectional view of a quick-disconnect coupling embodying the present invention;

FIG. 2 is a view looking at the right-hand end of the coupling shown in FIG. 1;

FIG. 3 is a perspective view of the nose member incorporated in the coupling of FIG. 1;

FIG. 4 is a view of a different type of coupling embodying the present invention with parts of the coupling shown in section;

FIG. 5 is a cross-sectional view taken approximately along line 5—5 of FIG. 4; and FIG. 6 is a perspective view showing the detail of parts used in the coupling shown in FIG. 4.

Referring to the drawings, FIG. 1 shows a coupling 10 having a socket part 11 and a plug part 12 which is received in the socket part 11. The socket part 11 has an axially extending passageway 13 therethrough which registers with an axially extending passageway 14 in the plug part 12 to form a fluid passage through the coupling 10.

At one end of the socket part 11, the internal wall of the passageway 13 is threaded, as indicated by the reference numeral 16, to provide a means for connecting the socket part to a pipe or other line, while at the other, or socket, end of the socket part 12, the passageway 13 is enlarged to provide an enlarged opening 18 for receiving a nose portion 20 formed on one end of the plug member 12. The other end portion, designated by the reference numeral 21, of the plug member 12 is threaded internally, as indicated at 22, to provide means for connecting the plug member to a flexible line or the like and the outside configuration of the end portion 21 is hexagonal, as is best shown in FIG. 2.

The socket part 11 is provided with a self-closing valve 23 which is disposed in the passageway 13 intermediate the threaded portion 16 and the enlarged opening 18 and is biased by a spring 24 to move toward the enlarged portion 18 and into engagement with a tapered seat 25 formed on a radially, inwardly extending shoulder 26 adjacent the inner end of the enlarged portion 18 of the passageway 13.

The valve 23 has an axially extending valve stem 28 which is slidably received in an opening in a spider 29 supported in the passageway 13. The spring 24 is disposed about the valve stem 28 and abuts the spider 29 and the head of the valve 23 and urges the valve away from the spider into engagement with the valve seat. The valve stem sliding in the spider guides the movement of the valve 23.

As the plug part 12 is inserted into the enlarged opening 18 of the passageway 13, a bridge 30 on a nose member 31 disposed in the passageway 14 of the plug part engages a projecting portion 32 extending from the valve 23 outwardly into the enlarged portion 18 and, as the plug part 12 is moved into the opening, the valve 23 is opened. When the plug part 12 has been fully inserted into the opening, as is shown in FIG. 1, the plug is locked in assembled relationship by a plurality of ball detents 33 disposed in individual openings in the wall of the enlarged opening 18 of the passageway 13. The balls 33 arranged in a circle about the passageway are adapted to project into the enlarged opening 18 in which the plug part 12 is received and the plug part 12 has an annular groove 35 therein adapted to receive the balls and cooperates therewith to lock the parts together when the balls are prevented from moving outwardly of their openings 34.

A locking sleeve 38 is disposed about the socket end of the socket part 11 and is slidable to a position where the balls 33 are locked in their position where they extend into the enlarged opening 18 and to a position displaced toward the other end of the socket part where the balls are free to move outwardly of their openings to release the plug part 12. The locking sleeve 38 is biased to a locking position by a spring 40 and is limited in its movement by the spring to its locking position by a snap ring 41 which forms a stop for the sleeve.

The locking sleeve and ball detent means have not been described in detail since the construction and operation of such locking sleeves and ball detents are well known to those skilled in the art. Moreover, the self-closing valve has not been described in considerable detail since this valve is also known in the art and is similar to that shown in United Patent No. 2,823,048.

In accordance with the present invention, the nose member 31 comprises, in addition to the bridge 30, a sleeve portion 42 having diametrically opposed, axially projecting tabs 43 at one end which are integrally connected to the opposite ends of the bridge 30 to interconnect the bridge and sleeve portion 42. The nose member is slightly smaller in diameter than the passageway 14 and is fixed in position in the passageway 14 by a band of solder 44 which extends around the sleeve portion of the nose member and is preferably coextensive with the axial extent of the sleeve portion. In any case, the band of solder 44 has an axial extent which is substantial as distinguished from a line or a narrow ring of solder.

The nose member 31 may be soldered in the passageway 14 by applying solder, for example, a ring of solder in wire form around one end of the sleeve after it is disposed in the passageway. The solder when fused will work its way by capillary action along the external circumference of the sleeve portion 42 and will form a band which interconnects the sleeve portion and the wall of the passageway 14.

It will be appreciated that the band of solder forms a connection between the sleeve 42 and the wall of the passageway 14 which is strong in shear and will take the biasing forces applied by the valve 23, tending to move the nose member along the passageway. The solder, however, will fuse when the temperature in the area reaches a predetermined level and allow the nose member to move in the passageway 14 under the action of the bias on the valve and thereby allow the valve 23 to close, even though the parts 11 and 12 remain in connected relationship.

The passageway 14 is cylindrical inwardly of the nose member 31 and the nose member 31 is free to move the necessary distance to allow the valve 23 to close, once the solder connecting the nose member and the wall of the passageway 14 has fused. The sleeve portion 42 closely conforms to the configuration of passageway 14 and the nose member 31 will be guided axially in the passageway when it moves after the solder has fused with little or no tendency to cock or jam. The sleeve portion 42 forms a guide which constrains the nose member to move axially in the passageway 14 and constrains the member against tipping or cocking once the soldered connection holding the nose member against movement has fused. Consequently, the sleeve portion forms both a guide part and a part for connecting the nose member 31 to the plug part 12.

Referring to FIG. 4, a quick-disconnect coupling having a socket part 46 and a plug part 47 is shown therein which generally corresponds in structure to the coupling of FIG. 1 and the parts which correspond will not be described in detail. Suffice it to say that the socket part 46 has a self-closing valve 60 which is opened when the plug part 47 is inserted into the socket part and the plug part 47 is locked in the socket part by ball detent and locking means corresponding to the ball detent and locking sleeve of FIG. 1. However, the self-closing valve 60 is of a different type from that shown in the coupling illustrated in FIG. 1, and is substantially the same as that shown in United States Patent No. 2,548,528.

Moreover, the plug part 47 of the coupling shown in FIG. 4 has a different type of nose member from the coupling shown in FIG. 1. In the coupling shown in FIG. 4, the nose member comprises a pin 62 which is supported by a spider 63 disposed in the passageway 64 through the plug part 12. The spider 63 has radially extending legs 65 which abut against an inwardly extending shoulder 66 in the passageway 64 and are held against the shoulder by a lock ring 67. The pin 62 extends from the spider 63 to engage the valve 60, when the plug 47 and socket part 46 are connected, to move the valve from the seat and open the passageway in the socket part.

The spider 63 has a cylindrical hub portion 68 and the pin 62 is received in a cylindrical opening in the hub portion. The pin is fixed to the hub portion 68 by a band of solder 69 which extends substantially entirely about the pin and preferably for substantially the entire length of the cylindrical hub portion 68. The soldered connection 69 may be made by assembling the spider and the pin in the proper relationship and applying solder about the pin at one end or both ends of the hub portion 68 and the solder will work its way along the pin and form a band of solder as described above.

It can be seen from the structure shown in FIG. 4 that the band of solder will have relatively high shear strength and will be capable of withstanding the biasing forces applied by the spring tending to close the valve 60. Moreover, when the solder fuses, the hub 68 will form a guide for the pin 62 and the pin will have little or no tendency to cock or jam in the passageway 14 and prevent the valve 60 from closing.

It can now be seen that couplings embodying the present invention are particularly suitable for connecting a gas appliance, for example, a stove, to a house line. The connection can be made quickly and easily and in the event of a fire in the area, the self-closing valve on the coupling will close to prevent the gas line from feeding the fire.

While the embodiments of the present invention have been described, it is hereby our intention to cover all embodiments, modifications, and constructions which fall within the ability of those skilled in the art and within the scope and spirit of the present invention.

Having described our invention, we claim:

1. A coupling having a fluid passageway therethrough, a self-closing valve disposed in said passageway and biased in one direction to a valve-closed position closing the passageway through the coupling, a sleeve member in said passageway having a first position engaging and holding said valve in an open position against the bias on the valve and providing for flow communication through said passageway and slidable to a second position wherein said valve is adapted to close under the bias thereon, said sleeve member having an axially extending portion closely fitting said passageway and corresponding in cross section to the latter, fusible material connecting said sleeve member to the side wall of said passageway and releasably holding said member in its first said position, said fusible material extending substantially entirely about said sleeve member for substantially the axial length thereof.

2. A coupling having a fluid passageway therethrough, a self-closing valve disposed in said passageway and biased in one direction to a valve-closed position, a pin axially disposed in said passageway and having a first position engaging and holding said valve in an open position against the bias on the valve, a part in said passageway slidably receiving and supporting said pin and having an axially extending opening therethrough in which said pin is positioned, said part providing for flow communication through said passageway in the valve open position, fusible material in said opening between said pin and said part and holding said pin against movement until said pin and part reach a predetermned temperature, said fusible material extending substantially about said pin for substantially the length of said opening.

3. A quick-disconnect coupling comprising a socket part having a first passage therethrough and defining at one end a socket, a plug part received in said socket and having a second passage therethrough aligned with said first passage, quick-disconnect means comprising releasable locking detents for releasably connecting the plug part in said socket to the socket part and a locking member for locking and releasing said detents, a valve in one of said parts movable toward the other part to a valve-closed position closing the passage through the one part, means biasing said valve to a closed position, a sleeve member positioned in the passage in the other part and having an axial opening therethrough, said sleeve member including an axially extending portion slidably fitting a portion of the passage in the other part and a portion adapted to engage and open said valve when said parts are connected and providing for flow communication between said passages, said sleeve member being held against movement in the passage in which it is positioned by the bias on said valve by means connecting said sleeve member to said other part and holding the latter against movement relative to said other part comprising fusible material adapted to fuse at a predetermined temperature to release said sleeve member to slide in the passage in which it is positioned and in turn release said valve for movement by said biasing means.

4. A quick-disconnect coupling comprising a socket part having a first passage therethrough and defining at one end a socket, a plug part received in said socket and having a second passage therethrough aligned with said first passage, quick-disconnect means comprising releasable locking detents for releasably connecting the plug part in said socket to the socket part and a locking member for locking and releasing said detents, a valve in one of said parts movable toward the other part to a valve-closed position closing the passage through the one part, means biasing said valve to a closed position, a sleeve member positioned in the passage in the other part and having an axial opening therethrough, said sleeve member including an axially extending portion slidably fitting a portion of the passage in the other part and a portion adapted to engage and open said valve when said parts are connected and providing for flow communication between said passages, said sleeve member being held against movement in the passage in which it is positioned by the bias on said valve by means connecting said sleeve member to said other part and holding the latter against movement relative to said other part comprising a band of solder between said portions and extending substantially about and axially of said portions and adapted to fuse at a predetermined temperature to release said sleeve member to slide in the passage in which it is positioned and in turn release said valve for movement by said biasing means.

5. A quick-disconnect coupling comprising a part having a first passage therethrough and defining at one end a socket, a plug part received in said socket and having a second passage therethrough aligned with said first passage, quick disconnect means comprising releasable locking detents for releasably connecting the plug part in said socket part, and a locking member for locking and releasing said detents, one of said parts having a self-closing valve in the passage therein biased toward the other part to a position closing the passage through the one part, the said other of said parts having a pin member disposed in said passage therethrough and adapted to engage said valve and hold said valve in an open position to provide for flow communication between said passages and to move axially away from said valve to allow said valve to close, means supporting said pin member in said passage and including a support portion fixed in said other of said parts and a tubular guide portion connected to said support portion and extending axially of said other part and slidably mounting said pin for movement axially of said first passage and holding the pin member against cocking in said first passage, fusible material connecting pin member to said means supporting said pin member and holding said pin member against movement by the bias on said valve and being adapted to fuse and release said pin member for movement axially of said passageway by the bias on said valve when subjected to a predetermined temperature.

6. A quick-disconnect coupling comprising a part having a first passage therethrough and defining at one end a socket, a plug part received in said socket and having a second passage therethrough aligned with said first passage, quick disconnect means comprising releasable locking detents for releasably connecting the plug part in said socket part, and a locking member for locking and releasing said detents, one of said parts having a self-closing valve in the passage therein biased toward the other part to a position closing the passage through the one part, the said other of said parts having a pin member disposed in said passage therethrough and adapted to engage said valve and hold said valve in an open position to provide for flow communication between said passages and to move axially away from said valve to allow said valve to close, means supporting said pin member in said passage and including a support portion fixed in said other of said parts and a tubular guide portion connected to said support portion and extending axially of said other part and slidably mounting said pin for movement axially of said first passage and holding the pin member against cocking in said first passage, a band of solder between said pin member and said tubular portion of said means for supporting the pin member in said passageway and extending substantially about and axially of said portions and connecting said pin member to said means supporting said pin member and holding said pin member against movement by the bias on said valve and being adapted to fuse and release said pin member for movement axially of said passageway by the bias on said valve when subjected to a predetermined temperature.

7. A coupling having a fluid passageway therethrough, a self-closing valve disposed in said passageway and biased in one direction to a valve-closed position closing the passageway through the coupling, a sleeve member in said passageway having an axially extending passage through which fluid flows, said sleeve member including an axially extending portion slidably fitting said passageway and a valve engaging portion for engaging and holding said valve in an open position against the bias on the valve and providing for flow communication through said passageway, fusible material connecting said sleeve member to the side wall of said passageway and releasably holding said member in a first position holding said valve open and adapted to fuse at a predetermined temperature to release said sleeve member for sliding movement in said passageway and in turn said valve for movement by said biasing means.

8. A coupling comprising a socket part having a first passage therethrough and defining at one end a socket, a plug part received in said socket and having a second passage therethrough aligned with said first passage, quick disconnect means for releasably connecting said plug part in said socket part, a valve member in one of said parts movable toward the other part to a valve-closed position closing the passage through the one part, means biasing said valve to a closed position, a member position in the passage in the other part, a pin acting between said members to hold said valve member in an open position providing for flow communication between said passages when said parts are connected, said pin including an axially extending portion slidably received in an opening in one of said members and a portion adapted to engage the other member to effect opening of said valve member when said parts are connected, said pin member being held against movement relative to said one member in said opening in which it is positioned by the bias on said valve member by means securing said pin in said opening in said one member and holding the latter against movement relative thereto and comprising fusible material adapted to fuse at a predetermined temperature to release said pin for sliding movement relative to said one member in the opening in which it is positioned to release said valve member for movement by said biasing means to its closed position.

References Cited by the Examiner
UNITED STATES PATENTS

| | | | |
|---|---|---|---|
| 195,367 | 9/1877 | Hiller | 137—74 X |
| 1,930,624 | 10/1933 | Ryan | 137—75 |
| 2,048,387 | 7/1936 | Johnsen | 137—75 |
| 2,305,841 | 12/1942 | Carlson | 251—149.6 |
| 2,434,167 | 1/1948 | Knoblauch | 251—149.6 |
| 2,850,297 | 9/1958 | Clark | 137—526 |

ISDAOR WEIL, *Primary Examiner.*

M. CARY NELSON, *Examiner.*